May 30, 1933.  R. R. PARKS  1,912,300

ELECTROMECHANICAL PLANT PROPAGATOR

Filed Jan. 5, 1933    2 Sheets-Sheet 1

Inventor
R. R. Parks

By Clarence A. O'Brien
Attorney

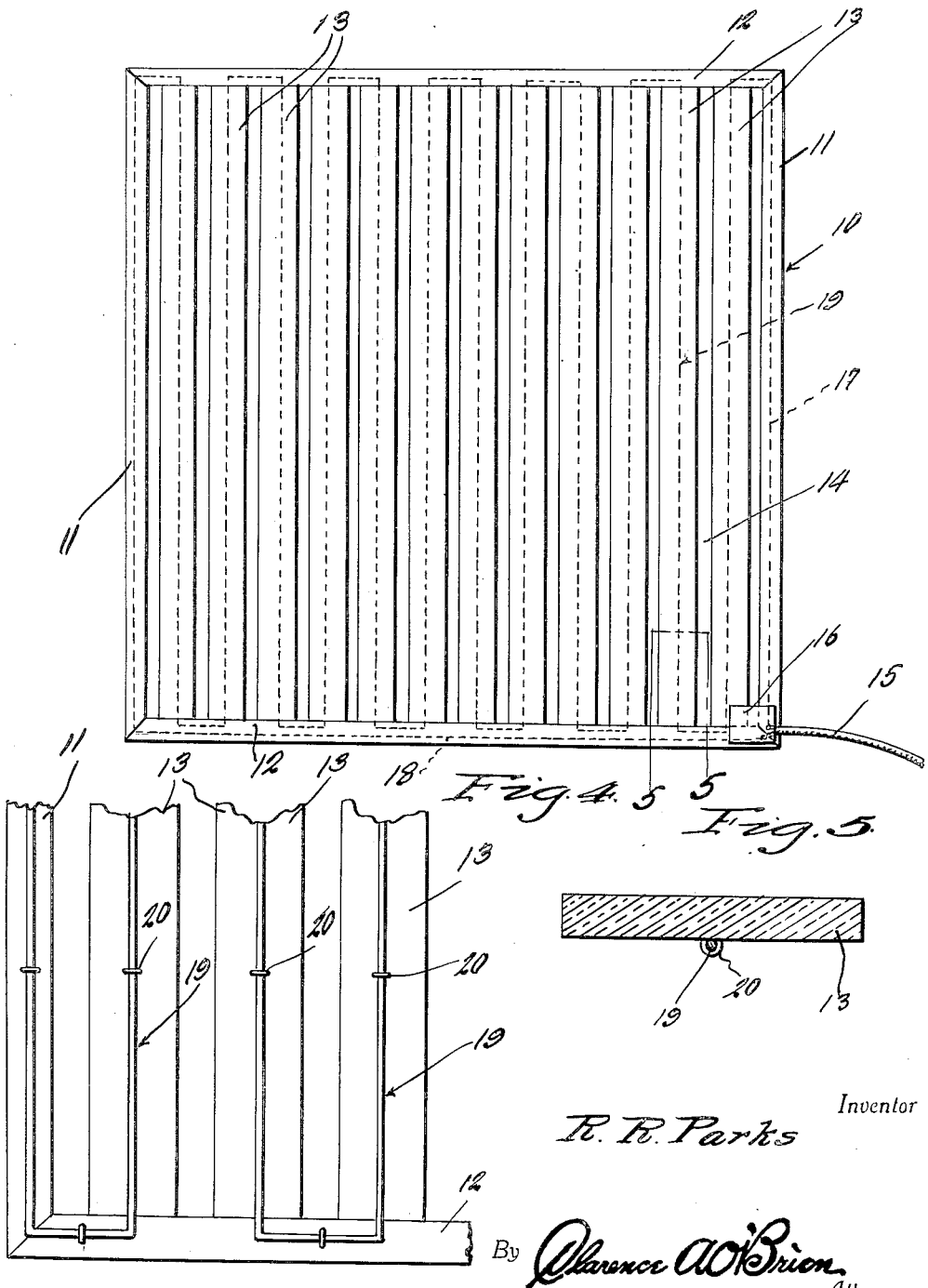

Patented May 30, 1933

1,912,300

UNITED STATES PATENT OFFICE

RALPH R. PARKS, OF COLUMBIA, MISSOURI

ELECTROMECHANICAL PLANT PROPAGATOR

Application filed January 5, 1933. Serial No. 650,321.

This invention relates to an improved electro-mechanical device or structure which is believed to be an innovation in the agricultural field in that it affords practical and dependable means for promoting the growth of plants, particularly that variety which is initially reared in so-called heated forcing beds.

It is a matter of common knowledge that electro-cultivation which consists in impregnating the soil with electrical current has proved beyond doubt that the use of electricity propagates and raises plants in record time. The process not only minimizes the growth of weeds and destroys bacteria, but reacts on the soil to promote requisite fertility and heat, thereby fostering the rapid growth of plants.

As a further aid to the propagation of plant life, mechanical mulches have been used. These mulches are generally in the form of paper coverings, boards and the like laid between the rows of planted seed and designed to kill or check the growth of weeds between the rows of cultivated plants by shading, or smothering the weeds to deprive them of light and air and such elements as would otherwise promote the growth of such weeds.

It is my ambition and aim to provide a further contribution to this line of endeavor by affording the trade a simple and economical device characterized by simplicity and convenience which possesses both the electrical and mechanical features above mentioned, said device being primarily, but not necessarily, adapted for use temporarily in plant beds.

In carrying the principles of the present inventive conception into practice, I have evolved and produced a portable device which may be used as an insert in the soil box wherein said device functions to simultaneously electrify the soil, define the rows for growth of the plants, and cover that portion of the soil between said rows.

Other features and advantages of the invention will become more readily apparent from the following description and drawings.

In the drawings:

Figure 3 is a plan view of the invention per se, removed from the box.

Figure 4 is a fragmentary bottom plan view of one corner portion of the device.

Figure 5 is an enlarged detail cross section on the plane of the line 5—5 of Figure 3.

Figure 1:
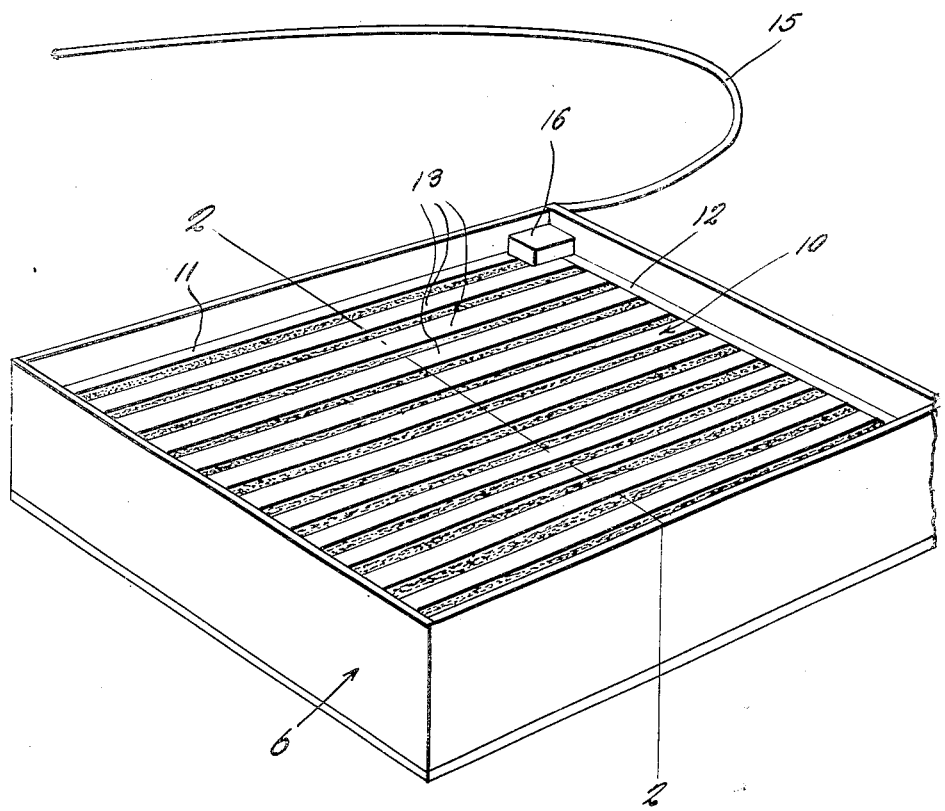
Figure 1 is a perspective view of the electro-mechanical plant propagator showing the manner in which it is removably inserted in the soil box.
Figure 2:
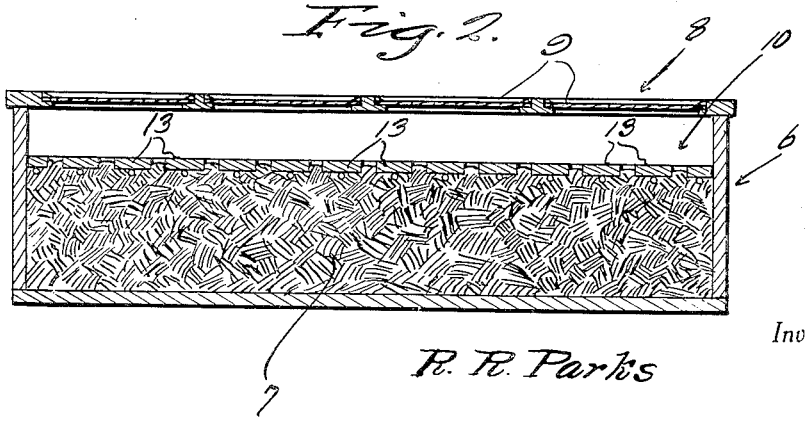
Figure 2 is a transverse vertical section taken approximately on the plane of the line 2—2 of Figure 1.

In the drawings, in Figures 1 and 2, the numeral 6 designates a suitably proportioned and shaped box or container for the soil 7. The numeral 8 designates a removable cover having appropriate window lights 9.

The removable unit constituting the so-called electro-mechanical plant propagator is generally denoted in Figure 3 by the numeral 10. This comprises a marginal frame shaped to fit down into the box, said frame embodying complemental rails 11 and 12 joined together in frame forming relationship.

Fastened between the rails 12 in spaced parallelism are relatively wide slats 13. The spaces 14 between these slats define the openings through which the rows of seed are exposed for growth in the usual manner. Manifestly, the slots 13 rest down on top of the soil to function as mulches and to impede the growth of weeds.

The soil electrifying and heating means comprises a power supply cable 15 attached to an automatic key-controlled thermostatic switch 16 at one corner of the device 10. The wires 17 and 18 connected thereto are bent to form a plurality of substantially U-shaped coils 19 which as shown in Figure 4 have their portions secured by appropriate fasteners 20 to the undersides of the slats and frame forming members.

It is to be noticed that these cables are centralized with respect to the slats so as to permit the slats to have the additional function of insulators and to protect the user against injury from electrical current.

In some respects the invention constituting the novelty of this application is similar to the so-called hot bed described in Patent 1,841,509, granted to A. Van Damme et al, under date of January 19, 1932. The patented device comprises an open-work skeleton frame formed of inverted channel members wherein the channel members have their tops formed to provide spaced parallel communicating grooves and wherein electrical heating elements are disposed in the grooves and electrically connected together through the instrumentality of a control switch, etc. In using the patented device the grooves are disposed upwardly and the device is placed on the ground and covered with dirt to the depth desired in which the seed is planted.

My invention instead of applying the heat under the surface and directing it upward applies it at the surface and directs it downward, the wires in my device being slightly imbedded in the soil. Hence, by centrally fastening the electrifying exposed or bare cable directly to the top surface of the soil I do not lose heat in the subsoil. Moreover, the width of the slats which serve as the carriers for the wires or cables also function as insulating elements to prevent upward leaking of the heat, and the frame together with the slats serves as a mulcher to prevent weed growth.

In my invention the device is constructed as a complete unit ready for installation and lies removably on the surface of the soil. It will be noticed also that the wires are not imbedded in the wood of the slats but merely attached to the underside thereof in order to utilize the complete heating surfaces of the wires which are bare and exposed to the soil.

By forming the cable into coils and attaching the portions of these coils uniformly to the entire underside of the frame and slats the strands of wire extend between the different rows of seed for uniform results. The wires are protected from mechanical injury and the user is protected from injury due to the fact that the wires are completely covered by the wooden elements of the carrier frame as a unit.

The device as a unit may be easily crated for shipping. Hence, these and other features and advantages of the invention have doubtless been made apparent from the foregoing description when taken in conjunction with the accompanying illustrative drawings.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. In a structure of the class described, in combination, an open top box adapted to contain a predetermined quantity of soil, a removable cover for the open top of said box, a removable electro-mechanical propagating unit, said unit resting removably on the top of the soil within the confines of said box and embodying a frame made up of spaced elements, together with electricity conducting wires attached in a systematic and uniform manner to the underside of said frame.

2. In a structure of the class described, in combination, an open top soil containing box adapted to receive a predetermined quantity of soil, a removable window-equipped cover for the open top of said box, and an electro-mechanical plant propagating device, said device comprising a frame fitting snugly in said box, a plurality of spaced parallel slats carried by said frame, and electricity conducting wires secured to the underside of the frame and slats.

3. In a structure of the class described, in combination, an open top soil containing box adapted to receive a predetermined quantity of soil, a removable window-equipped cover for the open top of said box, and an electro-mechanical plant propagating device, said device comprising a frame fitting snugly in said box, a plurality of spaced parallel slats carried by said frame, and electricity conducting cable secured to the underside of the frame and slats, the slats being spaced apart sufficiently far to permit penetration of the plant and said slats being sufficiently wide to function as mulchers between the rows of plants.

4. As a new article of manufacture, an electro-mechanical plant propagating device comprising a substantially rectangular frame, a plurality of relatively wide spaced parallel slats mounted in said frame, and electricity conducting cables, said cables being bare and secured to the underside of the frame members and slats in such a manner as to provide a plurality of coils and to permit the frame members and slats to function as mulchers, current and heat insulators, and supporting means for the cables.

In testimony whereof I affix my signature.

RALPH R. PARKS.